US006085330A

United States Patent [19]
Hewitt et al.

[11] Patent Number: 6,085,330
[45] Date of Patent: Jul. 4, 2000

[54] CONTROL CIRCUIT FOR SWITCHING A PROCESSOR BETWEEN MULTIPLE LOW POWER STATES TO ALLOW CACHE SNOOPS

[75] Inventors: Larry Hewitt, Austin, Tex.; James Bunnell, Lafayette, Colo.

[73] Assignee: Advanced Micro Devices, Inc., Sunnyvale, Calif.

[21] Appl. No.: 09/056,838

[22] Filed: Apr. 7, 1998

[51] Int. Cl.[7] ....................................................... G06F 1/32
[52] U.S. Cl. ............................ 713/322; 711/3; 711/146; 713/300
[58] Field of Search .................................. 713/300, 320, 713/322, 324; 711/3, 146, 203

[56] References Cited

U.S. PATENT DOCUMENTS

| 5,185,878 | 2/1993 | Baror et al. | 711/240.8 |
|---|---|---|---|
| 5,530,932 | 6/1996 | Carmean et al. | 713/324 |
| 5,617,557 | 4/1997 | Stevens | 711/146 |
| 5,669,003 | 9/1997 | Carmean et al. | 713/322 |
| 5,724,550 | 3/1998 | Stevens | 711/146 |
| 5,740,454 | 4/1998 | Kelly et al. | 713/320 |
| 5,754,816 | 5/1998 | Howard | 711/203 |
| 5,813,022 | 9/1998 | Ramsey et al. | 711/3 |

OTHER PUBLICATIONS

"Advanced Configuration and Power Interface Specification," Revision 1.0, Dec. 1996, pp. 1–1 thru 16–261.

*Primary Examiner*—Xuan M. Thai
*Attorney, Agent, or Firm*—Zagorin, O'Brien & Graham, LLP

[57] ABSTRACT

Power consumption is conserved in a computer system by, instead of forcing a processor to change from the stop clock state to a fully operational state, allowing the processor to transition from the stop clock state to the stop grant state. The stop grant state allows snoops so that the processor handles subsequent bus cycles and snoops that take place during the bus cycles. Following the snoops, the processor transitions back from the stop grant state to the stop clock state. In one embodiment, an automatic control circuit is connected to a processor in a computer system. When the processor is in the stop clock state, the automatic control circuit responds to a bus request, not by transitioning to the fully operational state, but instead by transitioning from the stop clock state to the snoopable stop grant state in which the processor clock is operating. The automatic control circuit allows the snoop to take place then, when the snoop is complete, automatically transitions the processor back to the stop clock state.

25 Claims, 2 Drawing Sheets

CONTROL CIRCUIT FOR SWITCHING A PROCESSOR BETWEEN MULTIPLE LOW POWER STATES TO ALLOW CACHE SNOOPS

BACKGROUND OF THE INVENTION

1. Field of the Invention

The present invention relates to power-controlled computer systems. More particularly, the present invention relates to power-conserving circuits and methods in computer systems with power control functionality.

2. Description of the Related Art

A power event is generated by a device in a computer system. Power events are generated by various devices that support a power interface such as an Advanced Configuration and Power Interface (ACPI), ranging from processors and controllers to many other devices with a wide range of complexity and sophistication. Power events include fixed ACPI events and general-purpose events. Fixed ACPI events include: (1) setting of a carry-bit of a power management timer, (2) actuation of a power button, (3) actuation of a sleep button, (4) a realtime clock (RTC) alarm wakeup, (5) setting of a wake status bit, (6) receipt of a system bus master request, and (7) raising of a global release status. General purpose events include various conditions designated to generate an event signal upon occurrence. General purpose events include wake events, a dispatching event for servicing an ACPI-aware device driver, and a queuing event for determining a control method to queue for execution. The device generating the power event signals the event via a network link to a server. ACPI events are typically signaled by a System Control Interrupt (SCI).

The ACPI specification defines four CPU power states as follows:

C0: The CPU is in a fully operational state.

C1: The CPU is in a halted state, having executed a halt instruction and awaiting an interrupt.

C2: The CPU is in a "stop grant" state, a low power state in which the CPU cache can still be snooped.

C3: The CPU is in a "stop clock" state, a low power state such that the CPU's cache cannot be snooped.

The ACPI specifies that the CPU is to consume less power in state C3 than in state C2, that the CPU is to consume less power in state C2 than in state C1, and that the CPU is to consume less power in state C1 than in state C0. The C0 state is a fully-operational state in which the processor is supported by a full-power expenditure. In a typical system, the CPU power consumption in the C2 state is about 10% of the power consumption in the C0 state. The power consumption in the C3 state is about one to two percent of the power consumption of C0 state. Power consumption differences of these magnitudes are typically very important in portable systems that have a charge lifetime that depends on the conservation of battery power.

During the operation of a computer system, when a PCI bus cycle transfers a request for access of system memory, a snoop of the CPU cache is typically necessary for several reasons. The snoop prevents the cycle from accessing invalid data, data that is only valid in the cache. The snoop also prevents cache data from being "old" or "obsolete" due to the fact that the system memory copy of the data has been updated by the PCI cycle.

The C2 state is defined as a "snoopable" state so that, for an access to system memory, monitoring is allowed to determine whether the data targeted by the access is in-fact within the CPU cache. Knowledge of which pieces of information reside in the CPU caches and system memories is important to ensure that only valid data, and not data which is obsolete, is accessed, All information is valid with respect to the CPU. However, the memory and caches may be accessed via various devices and buses that bypass the CPU. For example, a device on a PCI bus may attempt to access system memory without determining whether updated versions of the data reside in an internal CPU cache. Eventually, some data corresponding to information that has been changed in the CPU cache will be accessed by the device so that incorrect data is obtained. Accordingly, every access to system memory is "snooped" by accessing the corresponding data in the processor cache.

However, a problem is raised in the C3 state or "non-snoopable" state since power is conserved in the C3 state by disabling the timing CPU clock signals to the CPU so that the CPU is no longer operating. Since the CPU clock signals are disabled, the CPU cannot supply a "snoop" result. The ACPI requirements specify that a processor in the C3 state or non-snoopable state be activated to the full-function C0 state in response to a PCI request which typically signifies a request to snoop the CPU cache. Accordingly, under the ACPI specification, a processor in the C3 state responds to a PCI cycle request attempting to access system memory by entering the fully-powered C0 state to allow the cache to be snooped, allowing the snoop, then determining whether to return to the C3 state via software operating in the CPU.

Unfortunately, the act of forcing the CPU from the C3 state into the C0 state is sub-optimal because the C0 state consumes so much power.

What is needed is a circuit and operating technique for conserving power in a computer system such as a portable computer system that is generally compliant with the ACPI specification.

SUMMARY OF THE INVENTION

It has been discovered that power consumption is conserved in a computer system by, instead of forcing a processor to change from the stop clock state to a fully operational state, allowing the processor to transition from the stop clock state to the stop grant state. The stop grant state allows snoops so that the processor handles subsequent bus cycles and snoops that take place during the bus cycles. Following the snoops, the processor transitions back from the stop grant state to the stop clock state.

In accordance with an embodiment of the present invention, an automatic control circuit is connected to a processor in a computer system. When the processor is in the stop clock state, the automatic control circuit responds to a bus request, not by transitioning to the fully operational state, but instead by transitioning from the stop clock state to the snoopable stop grant state in which the processor clock is operating. The automatic control circuit allows the snoop to take place then, when the snoop is complete, automatically transitions the processor back to the stop clock state.

The described automatic control circuit and operating method advantageously prevent the consumption of excess power associated with making the processor fully operational. The full-power fully operational state consumes about ten times the power of the snoopable stop grant state that is advantageously activated by the automatic control circuit. The automatic control circuit and operating method are highly advantageous for portable computer systems in which every amp of current drain is advantageously conserved.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
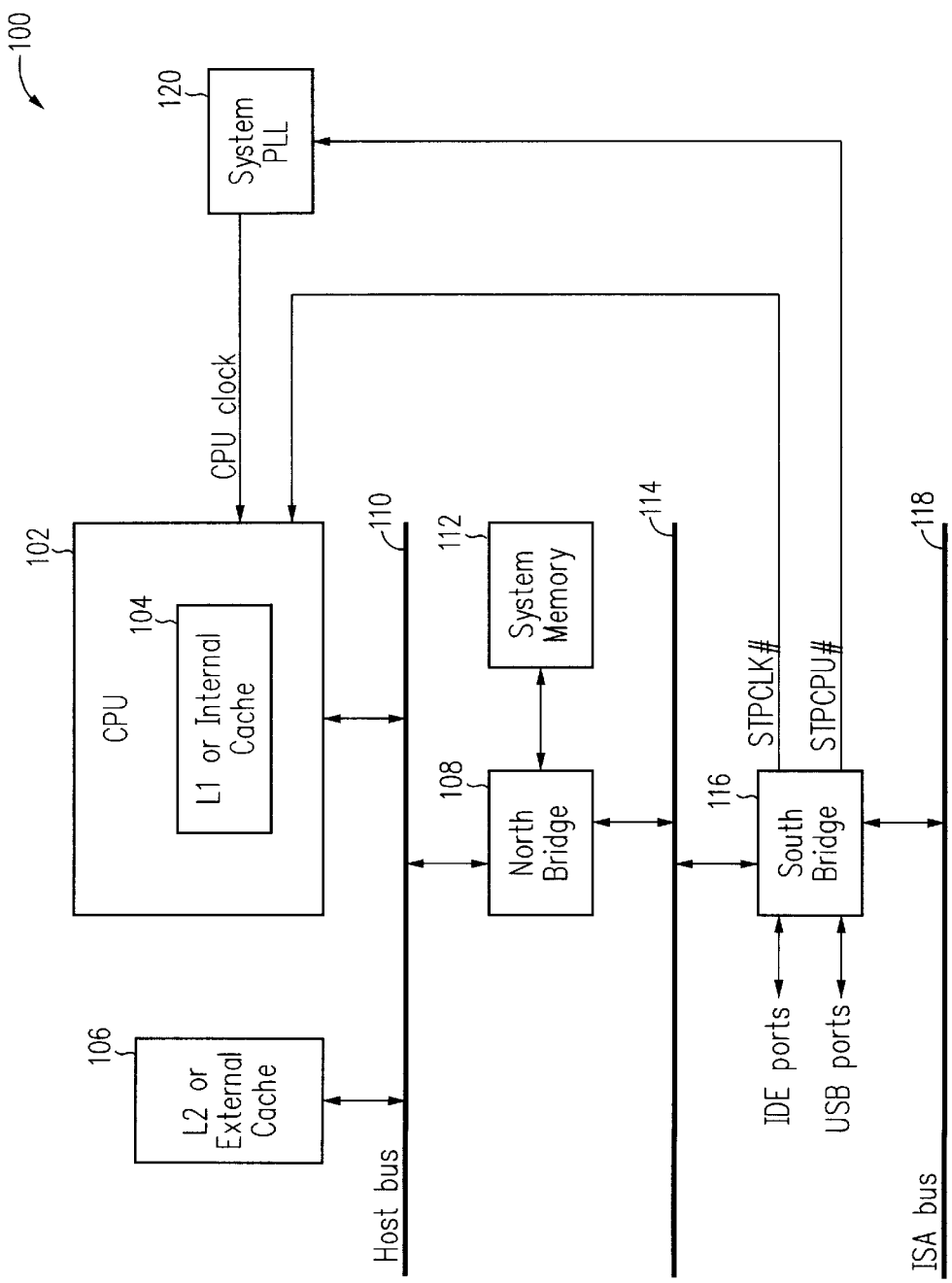
FIG. 1 is a schematic block diagram illustrating an embodiment of a computer system that includes stop grant (C2)—stop clock (C3) automatic control hardware.

Referring to FIG. 1, a schematic block diagram illustrates an embodiment of a computer system 100 that includes stop grant (C2)—stop clock (C3) automatic control hardware. In the description hereinafter the fully operational, halted, stop grant, and stop clock states are respectively referenced as states C0, C1, C2, and C3 to efficiently describe the operation of the automatic control hardware. Although the C0, C1, C2, and C3 terminology is consistent with the PCI bus and the ACPI specifications, the automatic control hardware may be similarly implemented using buses other than the PCI bus and control interfaces other than the ACPI.

The illustrative computer system 100 includes a processor 102 with an L1 or Internal Cache 104. The processor 102 has a timing that is controlled by a CPU clock signal from a System Phase-Locked Loop (PLL) 120. The System PLL 120 functions as a system-wide clock generator that supplies timing signals to the entire computer system 100 including timing signals for the PCI Bus 114, timing signals for the North Bridge 108, timing signals for the processor 102, and the like. The computer system 100 also includes an L2 or External Cache 106 and a first bridge, here designated a North Bridge 108. The processor 102 communicates with the External Cache 106 and en the North Bridge 108 via a Host Bus 110. The North Bridge 108 serves as an interface for connecting devices on the Host Bus 110 to a System Memory 112. The North Bridge 108 also serves as an interface between the Host Bus 110 and a second bus which is, in the illustrative embodiment, a Peripheral Component Interface (PCI) Bus 114. A second bridge, here designated a South Bridge 116, serves as an interface between the PCI Bus 114 and a third bus which is, in the illustrative embodiment, an Industry Standard Architecture (ISA) Bus 118. The South Bridge 116 also serves as an interface to various ports including Intelligent Drive Electronics (IDE) port and USB ports.

The South Bridge 116 includes a circuit for generating a stop clock signal STPCLK# on a line that is connected directly to the processor 102 and for generating a stop processor signal STPCPU# on a line that is connected to the System PLL 120. Assertion of the STPCLK# signal causes the processor 102 to enter a Stop Grant state, during which the internal clock of the processor 102 is stopped. From the Stop Grant state, the processor 102 can subsequently transition to a Stop Clock state, in which a bus clock CLK is stopped. When the processor 102 recognizes the STPCLK# signal and, in response to the signal, flushes instruction pipelines, completes all pending and in-progress bus cycles, stops the processor internal clock, and enters the Stop Clock state if system logic stops the bus clock CLK. The South Bridge 116 generates the STPCPU# signal to freeze the CPU clock signal.

When the South Bridge 116 is instructed to place the processor 102 into the C3 state, the South Bridge 116 responds by asserting the STPCLK# to the processor 102. The processor 102 responds by generating a stop-grant cycle to indicate that the processor 102 is operating in a low power state. The stop grant cycle is transmitted over the Host Bus 110 and the PCI Bus 114 and detected by the South Bridge 116. The South Bridge 116 responds by asserting STPCPU# to the System PLL 120, causing the System PLL 120 to freeze the CPU clock signal. With the CPU clock frozen, the processor 102 is in the low-power C3 state.

Typically, in current conventional computer systems, the C2 state is entered by asserting a STPCLK# signal to the CPU. The C3 state is entered by asserting the STPCLK# signal to the CPU and performing another action that affects the CPU clock. In some examples, such as Pentium II systems, the other action is assertion of the SLP# pin to the CPU to cause the internal clock and internal phase-locked loop (PLL) of the Pentium II to freeze. In an alternative example, the CPU clock pin can be disabled externally by asserting a CPU stop signal called STPCPU# to the PLL chip which supplies the clocks to most of the system, including the CPU.

In the illustrative computer system 100 utilizing C2–C3 automatic control hardware, when the South Bridge 116 detects the request of a PCI bus cycle (indicated by assertion of a PCI REQ# signal), the South Bridge 116 responds by de-asserting the STPCPU# signal, waiting a suitable period of time (generally 1 millisecond or less) to stabilize an internal phase-locked loop of the processor 102, and granting the PCI Bus 114 to the PCI master that is requesting the bus. The processor 102 is in the C2 state, which is a low power state but also a state in which the PCI cycle is allowed to snoop the Internal Cache 104 via a normal protocol that is controlled in the North Bridge 108. Once the PCI cycle is complete, the South Bridge 116 asserts the stop processor signal STPCPU# again and returns the processor 102 back in the C3 state for maximum power savings.

The aforementioned operating scenario presumes an embodiment of the computer system 100 utilizing a PCI Bus 114 with a PCI bus arbiter that communiates using a PCI bus protocol. In other embodiments, many other known and future buses may be utilized including ISA, EISA, SCSI, PCMCIA, and the like, each having a controller that performs a bus arbiter function using a bus protocol. Signals on other buses are implemented to control states that are functionally similar to the C0, C1, C2, and C3 states of the illustrative embodiment. For example, several ISA bus signals DRQ0–3 contribute the same effect of "breaking out" of the C3 state.

Furthermore, in the illustrative embodiment the computer system 100 has a PCI bus arbiter that is implemented in the South Bridge 116. In other embodiments, a PCI bus arbiter is located in other devices, such as the North Bridge 108 or other interfaces that are known in the processor art but not shown herein. For example, a PCI bus arbiter in the North Bridge 108 utilizes a signaling circuit (not shown) between the South Bridge 116 and an integrated circuit, such as an integrated circuit implementing the North Bridge 108, that includes the arbiter.

In various embodiments of the computer system 100, the signaling circuit is selected from one of several forms.

In one embodiment, an "any request" ANY_REQ signal is passed from the circuit including the PCI bus arbiter to the South Bridge 116. The ANY_REQ signal is the logical-OR of all PCI REQ# signals. The South Bridge 116 returns a "grant disable" GNT_DIS signal from the South Bridge 116 to the integrated circuit containing the PCI bus arbiter. The GNT_DIS signal disables the arbiter from granting the PCI Bus 114. The South Bridge 116 asserts the GNT_DIS signal while the processor 102 is in the stop clock (C3) state and uses the ANY_REQ signal to trigger a transition of the processor 102 to the stop grant (C2) state. Once the processor 102 is in the stop grant (C2) state, the GNT_DIS signal is deasserted to allow the PCI cycle to continue.

In an alternative embodiment utilizing a Pentium II processor, the signaling circuit is implemented which deasserts and asserts an SLP# pin to the Pentium II processor instead of asserting the STPCPU# signal to the System PLL 120.

Figure 2:
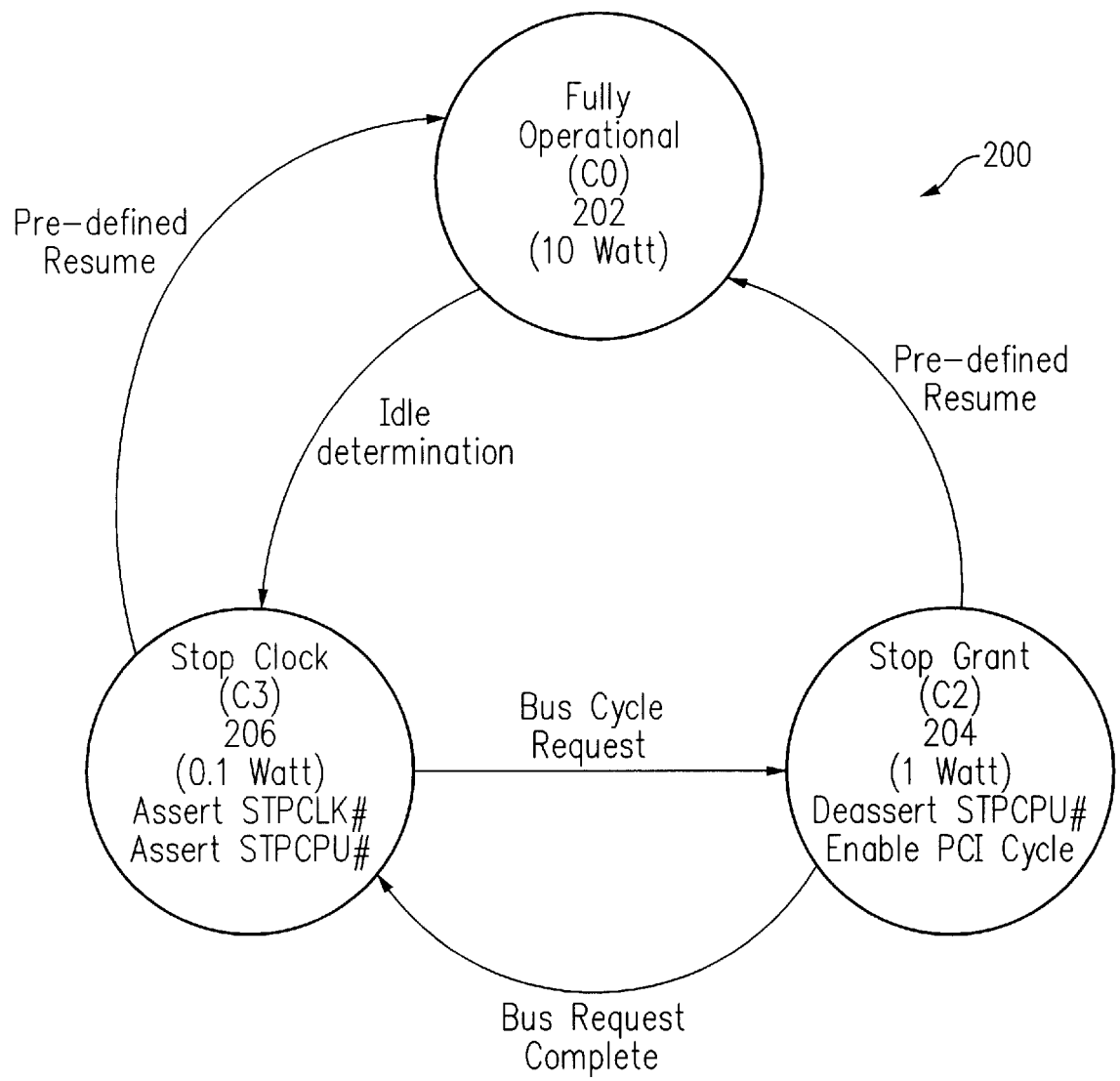
FIG. 2 is a schematic state diagram illustrating operations of a signaling circuit implementing the stop grant (C2)—stop clock (C3) Automatic Control Hardware described in FIG. 1.

Referring to FIG. 2, a schematic state diagram 200 illustrates operations of a signaling circuit implementing the stop grant (C2)—stop clock (C3) Automatic Control Hardware described in FIG. 1. In an illustrative example, the signaling circuit that performs the operations of the state diagram 200 is implemented in the South Bridge 116. The signaling circuit has three operating states that correspond to the fully operational, stop grant, and stop clock states. In some embodiments, the signaling circuit has operating states corresponding to the C0, C2, and C3 states of the ACPI specification. The initial state of the signaling circuit is the fully operational (C0) state 202. Several conditions cause initialization of the signaling circuit into the fully operational state 202 including predefined resume events that cause the signaling circuit to resume activity of the PCI Bus 114. The signaling circuit transitions from the fully operational (C0) state 202 to the stop clock (C3) state 206 in response to issuance of an Idle determination, for example a ACPI-defined command according to the ACPI specification.

The signaling circuit enters the stop clock state 206 by asserting the stop clock signal STPCLK# to the processor 102 and by asserting the stop processor signal STPCPU# to the System PLL 120. The signaling circuit asserts the stop processor signal STPCPU# and applies the signal to the System PLL 120. When STPCPU# becomes asserted, the System PLL 120 elegantly stops the CPU clock, without timing glitches. When the STPCPU# signal is subsequently deasserted, the CPU clock resumes, again without timing glitches. The signaling circuit remains in the stop clock state 206 as long as no bus cycle request signals, such as PCI REQ#, take place. When a bus cycle request, such as a PCI REQ#, occurs on the PCI Bus 114, the signaling circuit transitions from the stop clock state 206 to the stop grant state 204.

The signaling circuit enters the stop grant state 204 by deasserting the stop processor signal STPCPU# and enabling a PCI cycle. Accordingly, in the illustrative implementation, when the signaling circuit is in the stop clock state 206 and detects a PCI bus cycle by monitoring the PCI request signals PCI REQ#, the signaling circuit deasserts the stop processor signal STPCPU# alone which starts the CPU clock signal to the processor 102, and does not deassert the stop clock signal STPCLK#, leaving the processor 102 in the stop grant state 204. Then the signaling circuit allows a grant of the PCI Bus 114 by the North Bridge 108 so that snooping is allowed in the Internal Cache 104. In a conventional computer system, both the stop clock signal STPCLK# and the stop processor signal STPCPU# are deasserted so that the processor disadvantageously enters the high-power fully-operational (C0) state.

Once the stop processor signal STPCPU# is deasserted, a delay occurs while the phase-locked loop (not shown) that is internal to the processor 102 becomes operational. A typical duration of phase-locked loop initialization is approximately 500 µs to about 1 ms. The signaling circuit waits in the stop grant state 204 until a PCI cycle complete signal takes place, indicating that the PCI bus access is complete. The PCI cycle complete signal transitions the signaling circuit from the stop grant state 204 back to the low-power stop clock state 206 by again asserting the stop processor signal STPCPU#. The transition from the stop grant state 204 back to the low-power stop clock state 206 may be immediate in some embodiments and conditions but more typically the transition to the low-power stop clock state 206 is delayed, for example by using a timer, to allow for interactions and arbitrations for future transactions to occur.

In the illustrative embodiment of the computer system 100, the PCI bus arbiter is located in the North Bridge 108, a typical configuration in a PCI bus environment. The PCI bus arbiter generates the PCI cycle complete signal and the North Bridge 108 communicates the generated PCI cycle complete signal to the South Bridge 116 using simple communication on the PCI Bus 114. In other embodiments, other communication techniques may be used to send a PCI cycle complete signal from the North Bridge 108 to the South Bridge 116, allowing the PCI bus arbiter to enable the grant.

The signaling circuit transitions from either the stop clock state 206 or the stop grant state 204 to the initial fully operational state 202 on the occurrence of any predefined resume event. A most common predefined resume event is an interrupt including, for example, a keyboard interrupt or an interrupt generated by movement of a mouse interface. Other types of predefined resume events include various types of activity on the PCI Bus 114. Any of the predefined resume events transition the signaling circuit to the fully operational state 202.

The illustrative computer system 100 operates differently from a conventional system to save operating power while permitting snooping. In a conventional processor operating in the C3 state, a PCI REQ# signal is a predefined resume event which transitions the processor to the C0 state. Typically, the conventional processor has a power expenditure of about ten watts in the C0 state. In the illustrative computer system 100 using stop grant (C2)—stop clock (C3) state automatic hardware control, a PCI REQ# signal received while the processor 102 is operating in the stop clock state 206 causes a transition to the stop grant state 204 in which the processor 102 has a typical power expenditure of about one watt, advantageously reducing the power expenditure by an order of magnitude. The illustrative computer system 100 further reduces the power expenditure by remaining in the stop grant state 204 only to allow a bus cycle to take place, then returning to the very-low-power stop clock state 206 in which power consumption is further reduced to about 0.1 watt. In the conventional system, the processor remains in the high-power fully-operational (C0) state until an Idle determination such as a ACPI-defined command takes place.

Accordingly, the C2–C3 automatic control hardware advantageously controls the processor 102 to predominantly operate in the very-low-power (0.1 watt) stop clock state 206 and to enter the moderate-power (1 watt) stop grant state 204 only momentarily while servicing a PCI request before returning to the stop clock state 206. In contrast, a processor operating under ACPI standards converts for an indefinite time to the high-power (10 watt) C0 state upon an occurrence of a PCI request, and remains in the high-power C0 state until an ACPI-defined command is issued.

In addition to the signaling circuit logic implementing the state diagram 200, the computer system 100 includes modifications to operating system to enable and disable stop grant (C2)—stop clock (C3) automatic control hardware. In some embodiments, modifications are made to Basic Input/Output System (BIOS) firmware to initialize configuration registers (not shown) that selectively enable and disable the signaling circuit in the South Bridge 116. Programmable configuration registers allow the C2–C3 automatic control functionality to be enabled, thereby allowing power savings, or disabled to allow power control functionality, such as standard ACPI functionality.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A computer system comprising:

a processor including an internal cache, the processor operating in a plurality of power states including a fully operational state in which the processor is fully operational, a stop grant low-power state in which the internal cache is snooped, and a stop clock low-power state in which the internal cache is not snooped;

a clock generator coupled to the processor and generating a clock signal timing operations of the processor; and a state control circuit coupled to the processor and coupled to the clock generator, the state control circuit controlling the processor while operating in the stop clock low-power state to transition to the stop grant low-power state in response to a bus request signal, snoop the processor internal cache, and return from the stop grant low-power state to the stop clock low-power state following the snoops; and wherein the processor is initialized into the fully operational state and enters the fully operational state upon an occurrence of a predefined resume signal;

the processor transitions from the filly operational state to the stop clock low-power state on receipt of an idle determination; and the state control circuit transitions the processor from the stop grant low-power state to the stop clock low-power state on an occurrence of a bus cycle complete signal.

2. A computer system according to claim 1 further comprising:

a STPCLK# line for carrying a STPCLK# signal from the state control circuit to the processor; and a STPCPU# line for carrying a STPCPU# signal from the state control circuit to the clock generator.

3. A computer system according to claim 2 wherein:

the state controller asserts the STPCLK# signal and asserts the STPCPU# signal in the stop clock low-power state; and the state controller deasserts the STPCPU# signal on entry into the stop grant low-power state.

4. A computer system according to claim 1 wherein:

the clock generator is a system phase-locked loop (PLL) circuit.

5. A computer system according to claim 1 wherein:

the fully operational state is a C0 state;

the stop grant low-power state is a C2 state;

the stop clock low-power state is a C3 state; and the processor is compliant with an Advanced Configuration and Power Interface (ACPI) specification.

6. A computer system comprising:

a first bus;

a processor coupled to the first bus and including an internal cache, the processor operating in a plurality of power states including a fully operational state in which the processor is fully operational, a stop grant low-power state in which the internal cache is snooped, and a stop clock low-power state in which the internal cache is not snooped;

a clock generator coupled to the processor and generating a processor clock signal for timing operations of the processor;

a system memory coupled to the processor via the first bus;

a second bus coupled to the first bus; and an interface coupled to the processor via the second bus and the first bus, the interface including a state control circuit coupled to the processor and coupled to the clock generator, the state control circuit controlling the processor while operating in the stop clock low-power state to transition to the stop grant low-power state in response to a bus request signal, snoop the processor internal cache, and return from the stop grant low-power state to the stop clock low-power state following the snoops; and wherein the processor is initialized into the fully operational state and enters the fully operational state upon an occurrence of a predefined resume signal;

the processor transitions from the fully operational state to the stop clock low-power state on receipt of an idle determination; and the state control circuit transitions the processor from the stop grant low-power state to the stop clock low-power state on an occurrence of a bus cycle complete signal.

7. A computer system according to claim 6 further comprising:

a STPCLK# line for carrying a STPCLK# signal from the state control circuit to the processor; and a STPCPU# line for carrying a STPCPU# signal from the state control circuit to the clock generator.

8. A computer system according to claim 7 wherein:

the state controller asserts the STPCLK# signal and asserts the STPCPU# signal in the stop clock low-power state; and the state controller deasserts the STPCPU# signal on entry into the stop grant low-power state.

9. A computer system according to claim 6 wherein:

the clock generator is a system phase-locked loop (PLL) circuit.

10. A computer system according to claim 6 wherein:

the fully operational state is a C0 state;

the stop grant low-power state is a C2 state;

the stop clock low-power state is a C3 state; and the processor is compliant with an Advanced Configuration and Power Interface (ACPI) specification.

11. A method of operating a computer system including a processor with an internal cache, the processor operating in a plurality of power states including a fully operational state in which the processor is fully operational, a stop grant low-power state in which the internal cache is snooped, and a stop clock low-power state in which the internal cache is not snoopable, the method comprising:

operating the processor in the fully operational state;

transitioning the processor from the fully operational state to the stop clock low-power state on an occurrence of an idle determination, generation of an external processor clock being stopped in the stop clock low-power state;

transitioning the processor from the stop clock low-power state to the stop grant low-power state on an occurrence of a memory access request, generation of the external processor clock being enabled in the stop grant low-power state and an internal processor clock being stopped in the stop grant low-power state;

while the processor is operating in the stop grant low-power state, snooping the processor internal cache; and transitioning from the stop rant low-power state to the stop clock low-power state following the snoops.

12. A method according to claim 11 further comprising:

transitioning the processor from the stop grant low-power state or the stop clock low-power state to the fully operational state on an occurrence of a predefined resume event.

13. A method according to claim 11 further comprising:

transitioning the processor from the stop grant low-power state or the stop clock low-power state to the fully operational state on an occurrence of an interrupt.

14. A method according to claim 11 further comprising:

transitioning the processor from the stop grant low-power state to the stop clock low-power state on an occurrence of a bus cycle complete signal.

15. A method according to claim 11 further comprising:

on entering the stop grant low-power state, deasserting a STPCPU# signal stopping generation of the external processor clock to the processor; and also on entering the stop grant low-power state, enabling a bus cycle.

16. A method according to claim 11 further comprising:

the fully operational state is a C0 state;

the stop grant low-power state is a C2 state;

the stop clock low-power state is a C3 state; and operating the processor in compliance with an Advanced Configuration and Power Interface (ACPI) specification.

17. A method of operating a computer system including a processor with an internal cache, the processor operating in a plurality of power states including a fully operational state in which the processor is fully operational, a stop grant low-power state in which the internal cache is snooped, and a stop clock low-power state in which the internal cache is not snooped, the method comprising:

operating the processor in the fully operational state;

transitioning the processor from the fully operational state to the stop clock low-power state on an occurrence of an idle determination;

transitioning the processor from the stop clock low-power state to the stop grant low-power state on an occurrence of a bus request signal;

on entering the stop clock low-power state, asserting a STPCLK# signal causing the processor to enter a Stop Grant low-power state during which an internal clock of the processor is stopped; and also on entering the stop clock low-power state, asserting a STPCPU# signal stopping generation of an external processor clock to the processor.

18. A method of operating a computer system including a processor with an internal cache, the processor operating in a plurality of power states including a fully operational state in which the processor is fully operational, a stop grant low-power state in which the internal cache is snooped, and a stop clock low-power state in which the internal cache is not snooped, the method comprising:

operating the processor in the fully operational state;

transitioning the processor from the fully operational state to the stop clock low-power state on an occurrence of a predefined command, the stop clock low-power state being a state in which an external clock supplied to the processor is stopped;

transitioning the processor from the stop clock low-power state to the snoopable stop grant low-power state on an occurrence of a memory access request, the stop grant low-power state being a state in which the external clock supplied to the processor is running and an internal clock in the processor is stopped; snooping the internal cache in the processor in the stop grant low-power state; and after the snoop is complete, transitioning the processor from the stop grant low-power state to the stop clock low-power state.

19. A method according to claim 18 wherein:

transitioning the processor from the stop-grant low power state to the stop clock low-power state occurs on an occurrence of a bus cycle complete signal.

20. A method according to claim 18 further comprising:

transitioning the processor from the stop grant low-power state or the stop clock low-power state to the fully operational state on an occurrence of a predefined resume event.

21. A method according to claim 18 further comprising:

transitioning the processor from the stop grant low-power state or the stop clock low-power state to the fully operational state on an occurrence of an interrupt.

22. A method according to claim 18 further comprising:

on entering the stop grant low-power state, deasserting a STPCPU# signal to resume generation of the external clock to the processor; and also on entering the stop grant low-power state, enabling a bus cycle.

23. A method according to claim 18 further comprising:

the fully operational state is a C0 state;

the stop grant low-power state is a C2 state;

the stop clock low-power state is a C3 state; and operating the processor in compliance with an Advanced Configuration and Power Interface (ACPI) specification.

24. The method as recited in claim 18 wherein the memory access request is indicated by a bus request signal.

25. A method of operating a computer system including a processor with an internal cache, the processor operating in a plurality of power states including a fully operational state in which the processor is fully operational, a stop grant low-power state in which the internal cache is snooped, and a stop clock low-power state in which the internal cache is not snooped, the method comprising:

operating the processor in the fully operational state;

transitioning the processor from the fully operational state to the stop clock low-power state on an occurrence of a predefined command;

transitioning the processor from the stop clock low-power state to the snoopable stop grant low-power state on an occurrence of a bus request signal;

allowing a snoop to take place in the stop grant low-power state;

when the snoop is complete, transitioning the processor from the stop grant low-power state to the stop clock low-power state;

on entering the stop clock low-power state, asserting a STPCLK# signal causing the processor to enter a Stop Grant low-power state during which an internal clock of the processor is stopped; and also on entering the stop clock low-power state, asserting a STPCPU# signal stopping generation of an external processor clock to the processor.

* * * * *